(12) United States Patent
Lin

(10) Patent No.: US 12,383,040 B2
(45) Date of Patent: Aug. 12, 2025

(54) HAIR DRYER HAVING REVERSE BLOWING DUST-REMOVAL FUNCTION

(71) Applicant: Shenzhen Wizevo Technology Co., Ltd., Guangdong (CN)

(72) Inventor: Yuan Lin, Guangdong (CN)

(73) Assignee: Shenzhen Wizevo Technology Co., Ltd., Guangdong (CN)

( * ) Notice: Subject to any disclaimer, the term of this patent is extended or adjusted under 35 U.S.C. 154(b) by 765 days.

(21) Appl. No.: 17/693,582

(22) Filed: Mar. 14, 2022

(65) Prior Publication Data

US 2022/0192340 A1   Jun. 23, 2022

Related U.S. Application Data

(63) Continuation of application No. PCT/CN2020/115283, filed on Sep. 15, 2020.

(30) Foreign Application Priority Data

Sep. 16, 2019   (CN) .......................... 201910870951.7

(51) Int. Cl.
A45D 20/12   (2006.01)
(52) U.S. Cl.
CPC .................................... *A45D 20/12* (2013.01)
(58) Field of Classification Search
CPC ...................................................... A45D 20/12

(Continued)

(56) References Cited

U.S. PATENT DOCUMENTS 3,309,783 A * 3/1967 Worst ...................... D06F 58/08
34/547
6,148,537 A * 11/2000 Altamore ............... A45D 20/10
34/97

(Continued)

FOREIGN PATENT DOCUMENTS

CN   202035639 U   11/2011
CN   104729016 A   6/2015

(Continued)

OTHER PUBLICATIONS

Notification of Rejection cited in corresponding Japanese patent Application No. 2022-515618, dated Mar. 5, 2024, 8 pages.

(Continued)

*Primary Examiner* — Stephen M Gravini
(74) *Attorney, Agent, or Firm* — Cooper Legal Group, LLC

(57) ABSTRACT

Disclosed is a hair dryer having a reverse blowing dust-removal function, comprising a housing, a fan module, an air inlet, and an air outlet. The housing has a pass-through airflow channel between the air inlet and the air outlet. The fan module is disposed within the airflow channel of the housing. A circuit control board is disposed within the housing. A microcontroller and a power supply drive module are disposed on the circuit control board. The power supply drive module is connected to the fan module. The microcontroller is connected to the power supply drive module. A reverse rotation button and a forward rotation button that are connected to the micro-controller are disposed on the housing. The micro-controller controls, in response to a reverse rotation signal output by the reverse rotation button, the fan module to rotate in a reverse direction by means of the power supply drive module.

7 Claims, 5 Drawing Sheets

(58) Field of Classification Search
USPC .................................................. 34/95–100
See application file for complete search history.

(56) References Cited

U.S. PATENT DOCUMENTS

| | | | | |
|---|---|---|---|---|
| 6,367,162 | B2 * | 4/2002 | Fukumoto | A45D 20/10 34/97 |
| 7,191,489 | B1 * | 3/2007 | Heath | B08B 9/0433 15/320 |
| 9,962,047 | B2 * | 5/2018 | Brown | A47L 9/1608 |
| 11,605,997 | B2 * | 3/2023 | Kim | H02K 11/33 |
| 11,633,028 | B2 * | 4/2023 | Kim | A45D 20/12 34/97 |
| 11,779,182 | B1 * | 10/2023 | Harmelink | A47L 11/4041 15/320 |
| 12,090,650 | B2 * | 9/2024 | Romanov | A47L 11/4036 |
| 12,173,962 | B2 * | 12/2024 | Zielinski | F26B 3/02 |
| 2022/0192340 | A1 * | 6/2022 | Lin | H02P 6/04 |
| 2023/0240423 | A1 * | 8/2023 | Li | A45D 20/122 34/98 |

FOREIGN PATENT DOCUMENTS

| | | | | |
|---|---|---|---|---|
| CN | 108851462 | A | | 11/2018 |
| CN | 109330154 | A | | 2/2019 |
| CN | 110638181 | A * | 1/2020 | ............ A45D 20/10 |
| CN | 111194985 | A | | 5/2020 |
| CN | 212036420 | U | | 12/2020 |
| EP | 4014783 | A1 * | 6/2022 | ............ A45D 20/10 |
| JP | 54-079885 | U | | 6/1979 |
| JP | 2000291999 | A | | 10/2000 |
| JP | 2012228062 | A | | 11/2012 |
| JP | 2013111226 | A | | 6/2013 |
| KR | 20120079871 | A | | 7/2012 |
| WO | WO-2021052313 | A1 * | 3/2021 | ............ A45D 20/10 |

OTHER PUBLICATIONS

International Search Report for PCT/CN2020/115283 dated Dec. 16, 2020, (6 pages).

* cited by examiner

HAIR DRYER HAVING REVERSE BLOWING DUST-REMOVAL FUNCTION

CROSS-REFERENCE TO RELATED APPLICATION

This application is a continuation of PCT application No. PCT/CN2020/115283, filed on Sep. 15, 2020, which claims a priority and benefit of China patent application No. 201910870951.7, filed on Sep. 16, 2019. The entirety of PCT application No. PCT/CN2020/115283 and China patent application No. 201910870951 are hereby incorporated by reference herein and made a part of this specification.

TECHNICAL FIELD

The present application relates to the technical field of hair care equipment, and in particular, to a hair dryer having a reverse blowing dust-cleaning function.

BACKGROUND ART

Generally, a hair care appliance, for example, a hair dryer, is used for blowing hair and hair styling. A commercially available hair dryer includes a housing, a brush motor, a fan blade, a heating resistance wire arranged in the housing and a switch. An air inlet and an air outlet are provided on the housing. An air inlet baffle is arranged at the air inlet, and a plurality of air inlet holes are arranged on the air inlet baffle. After the hair dryer is power-on by closing the switch, the brush motor drives the fan blade to rotate and push the air. The air is heated by the powered-on heating resistance wire and blown out from the air outlet for drying hair and hair styling.

However, under long-term use of hair dryer, the air inlet holes of the air inlet baffle is often blocked by the foreign matters such as hair and dust, resulting in the reduction in an air inflow of the housing. Therefore, the user needs to clean the foreign matters such as hair and dust on the air inlet holes to keep the air inlet unobstructed. However, with a large number of air inlet holes, the user needs to dredge the air inlet holes one by one, resulting in a low efficiency on dust-cleaning, which thus is required to be improved.

SUMMARY

For solving the above problem in the prior art, the present application provides a hair dryer having a reverse blowing dust-cleaning function, which has a high efficiency on dust-cleaning.

The above technical purpose of the present application is realized by the following technical solution:
a hair dryer having a reverse blowing dust-cleaning function, comprising: a housing, an air machine module, an air inlet and an air outlet, the air inlet and the air outlet are arranged on the housing, a through airflow channel is formed between the air inlet and the air outlet in the housing, the air machine module is arranged in the airflow channel of the housing, a circuit control board is arranged in the housing, the circuit control board is connected to the air machine module, and a trigger portion is arranged on the housing, the trigger portion is connected to the circuit control board for controlling the air machine module to rotate forward or in reverse.

In the above technical solution, the trigger portion can control the air machine module to rotate forward, and the air machine module can introduce air from the air inlet and blow out from the air outlet to dry the hair. When the foreign matters such as hair and dust are blocked on the air inlet, resulting in a small air volume at the air outlet, the present application can control the reverse rotation of the air machine module through the trigger portion, and then the air machine module can introduce air from the air outlet and blow out from the air inlet, to facilitate the reverse blowing off of the foreign matters such as hair and dust blocked on the air inlet, abandon the traditional way that users manually clean the air inlet, and improve the dust-cleaning efficiency of the air inlet.

In an embodiment, a microcontroller is provided on the circuit control board, a power drive module is arranged in housing, the power drive module is connected to the air machine module, the microcontroller is connected to the power drive module, and the trigger portion is connected to the microcontroller.

In the above technical solution, the setting of the microcontroller and the power drive module, when the user triggers the trigger portion, the microcontroller can drive the air machine module to rotate through the power drive module.

In an embodiment, the trigger portion comprises a reverse button and a forward button that are arranged on the housing and connected to the microcontroller; the microcontroller responds to a forward rotation signal output by the forward button to control, by the power drive module, the air machine module to rotate forward, the microcontroller responds to a reverse signal output by the reverse button to control, by the power drive module, the air machine module to rotate in reverse, and the microcontroller responds to a reverse signal output by the reverse button only when the forward button is not triggered.

In the above technical solution, the forward button is triggered to rotate the air machine module in the forward direction. The air machine module introduces air from the air inlet and blows out from the air outlet. When the foreign matters such as hair and dust are blocked on the air inlet, resulting in a small air volume at the air outlet, the present application can control the reverse rotation of the air machine module by triggering the reverse button, and then the air machine module can introduce air from the air outlet and blow out from the air inlet, to facilitate the reverse blowing off of the foreign matters such as hair and dust blocked on the air inlet. The forward button and the reverse button are provided separately to improve the user's operation convenience.

In an embodiment, the air machine module comprises a driving motor and a fan blade arranged on an output shaft of the driving motor, and the driving motor is electrically connected to the power drive module.

In the above technical solution, the power drive module drives the driving motor to rotate forward or reverse at high speed, and then air flow can be formed through the fan blades to realize a forward flow of air from the air inlet to outlet, and a reverse flow of air from the air outlet to air inlet, to realize the use of the blowing function of the hair dryer in the forward flow of air, and the use of the reverse blowing dust-cleaning function of the hair dryer at the air inlet in the reverse flow of air.

In an embodiment, a mounting sleeve is arranged in the airflow channel, the driving motor is arranged in the mounting sleeve.

In the above technical solution, the driving motor can be protected by the mounting sleeve.

In an embodiment, an air inlet baffle is arranged at the air inlet, a plurality of air inlet holes are arranged on the air inlet baffle, and a sponge filter screen is arranged on an inner side of the air inlet baffle.

In the above technical solution, when the air machine module rotates in the forward direction, the air enters from the air inlet, the foreign matters with large particles are blocked out by the air inlet hole, and the foreign matters of fine, soft such as dust and hair are blocked out by the sponge filter screen. Therefore, when the air machine module rotates in the reverse direction, the air is blown out from the air inlet, to facilitate the blocked foreign matters to be blown off from the sponge filter screen and the air inlet hole.

In an embodiment, the reverse button is a key button, the microcontroller outputs a modulation control signal to the power drive module in response to a reverse signal output by the reverse button, and the air machine module is controlled by the power drive module to rotate in reverse at a preset rotate speed.

In the above technical solution, when the reverse button is triggered, the air machine module can rotate in reverse at the preset speed, to realize a reverse blowing dust-cleaning at a fixed speed. It has simple structure and convenient operation.

In an embodiment, the forward button is a stepless regulating switch, the microcontroller outputs a modulation control signal to the power drive module in response to a forward rotation signal output by the forward button, and the air machine module is controlled by the power drive module to rotate forward at a regulated rotate speed.

In the above technical solution, when the reverse button is the stepless regulating switch, the air machine module can realize the adjustment and control of the reverse speed with the adjustment of the stepless regulating switch, to facilitate the user to adjust the reverse wind speed reasonably according to the blockage of foreign matters, realize the adjustment of the intensity of the reverse blowing dust-cleaning, and have high adaptability.

In an embodiment, the forward button is a stepless regulating switch, the microcontroller output a modulation control signal to the power drive module in response to a forward rotation signal output by the forward button, and the air machine module is controlled by the power drive module to rotate forward at an adjusted rotate speed.

In the above technical solution, the setting that the forward button is the stepless regulating switch. Through the setting of the forward button, the adjustment and control of forward rotation speed and the adjustment of air speed at the air outlet can be realized, and have high adaptability.

In an embodiment, the microcontroller is connected to a current detection circuit and a rotate speed detection circuit, the current detection circuit is connected to the power drive module for detecting a current input current of the air machine module, and the rotate speed detection circuit is connected to the air machine module for detecting a current rotate speed of the air machine module;

the microcontroller is configured to control the hair dryer to enter a dust-cleaning detection mode, in the dust-cleaning detection mode, based on a current rotate speed and a current input current of the air machine module when the forward button is triggered, the microcontroller compares the current input current at the current rotate speed with a rated input current at a rated rotate speed to control the air machine module to enter a to-be-cleaned state;

in the to-be-cleaned state, the microcontroller controls the air machine module to rotate in reverse after a preset time for which the forward button is not triggered.

In the above technical solution, the current detection circuit is used for detect the current input current of the air machine module in real time, and the rotate speed detection circuit is used for detect the current speed of the air machine module. When the microcontroller controls the hair dryer to enter the dust-cleaning detection mode, the microcontroller can compare the current speed and current input current with the rated speed and rated input current, since the air machine module rotates at a constant speed, when the wind resistance in the airflow channel increases, the current speed of the air machine module will decrease. The microcontroller will keep the current speed below the rated speed, which will increase the current input current of the air machine module, to compare the current input current with the rated input current. When the current input current exceeds the error range of the rated input current, it indicates that the air inlet is blocked by the foreign matters such as hair and dust, resulting in the increase of wind resistance in the airflow channel.

In the to-be-cleaned state, the microcontroller will control the air machine module to rotate in reverse for a preset time after the hair dryer has not been blown for a preset time, to blow in reverse the foreign matters such as hair and dust on the air inlet, to achieve the purpose of the reverse blowing dust-cleaning.

In an embodiments, the housing is further provided with a selector switch connected to the microcontroller, and the selector switch is configured to have an automatic dust-cleaning mode and a manual dust-cleaning mode;

in the manual dust-cleaning mode, the reverse button is allowed to be started;

in the automatic dust-cleaning mode, the microcontroller controls the hair dryer to enter the dust-cleaning detection mode.

In the above technical solution, the setting of the selector switch, the user can choose independently and improve the convenience of the reverse blowing dust-cleaning function of the hair dryer.

In an embodiment, the power drive module includes a rectifier unit, a filter unit and an inverter unit, the inverter unit is respectively connected to the filter unit and the air machine module, and the inverter unit receives the modulation control signal output by the microcontroller to control the action of the air machine module.

In the above technical solution, the microcontroller outputs the modulation control signal to the inverter unit, which can control the forward rotation, reverse rotation and speed adjustment of the air machine module.

To sum up, the beneficial effects of the present application compared with the existing technology are:

when the foreign matters such as hair and dust are blocked on the air inlet, resulting in a small air volume at the air outlet, the present application can trigger the reverse button to control the reverse rotation of the air machine module, and then the air machine module can introduce air from the air outlet and blow out from the air inlet, to facilitate the reverse blowing off of foreign matters such as hair and dust blocked on the air inlet. The traditional method of manual cleaning of air inlet by users is abandoned, so the dust-cleaning efficiency of air inlet is improved.

DETAILED DESCRIPTION

The technical solution in embodiments of the present application will be clearly and completely described below with references to the drawings of the present application. Obviously, the described embodiments are only a part of the embodiments of the present application, not all of the embodiments. Based on the embodiments in the present application, all other embodiments obtained by those skilled in the art belong to the protection scope of the present application.

Embodiment 1

Figure 1:
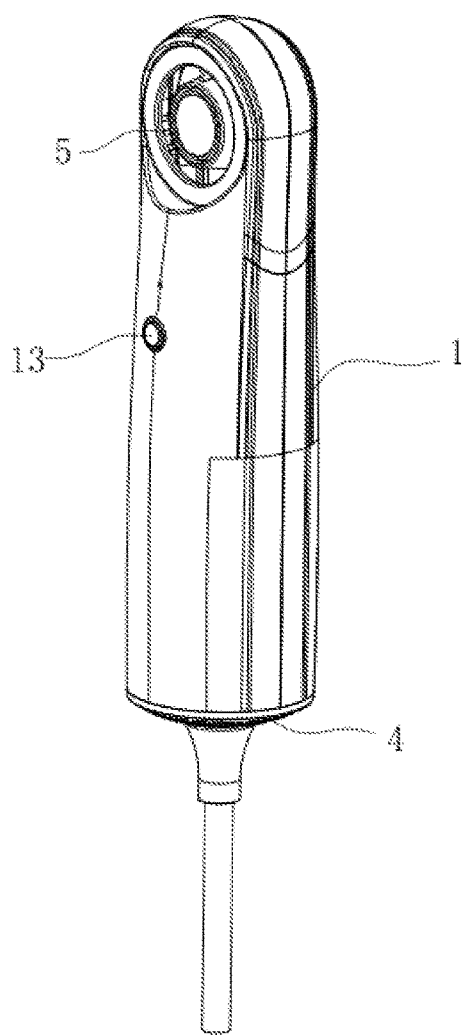
FIG. 1 is a schematic diagram illustrating a first overall structure of a hair dryer according to the present application.
Figure 3:
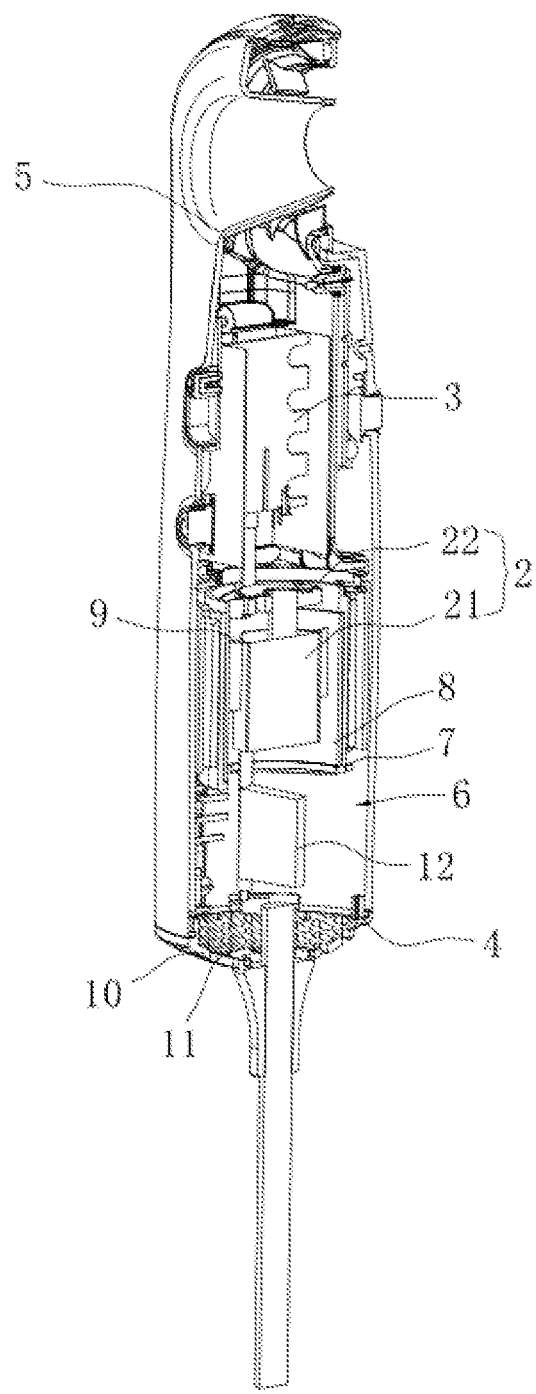
FIG. 3 is a sectional view of a hair dryer according to the present application.

As shown in FIGS. 1 and 3, a hair dryer having a reverse blowing dust-cleaning function includes a housing 1, an air machine module 2, a heating module 3, an air inlet 4 and an air outlet 5. The housing 1 is in a cylindrical shape. The air inlet 4 is arranged at a lower end of the housing 1, and the air outlet 5 is arranged at an upper end of the housing 1. A through airflow channel 6 is formed between the air inlet 4 and the air outlet 5 of the housing 1, and the heating module 3 and the air machine module 2 are successively arranged in the airflow channel 6 of the housing 1. The air machine module 2 is arranged close to the air inlet 4 and the heating module 3 is arranged close to the air outlet 5.

The air machine module 2 includes a driving motor 21 and a fan blade 22 arranged on an output shaft of the driving motor 21. In one embodiment, the driving motor 21 is a brushless motor 21 that is a Nd—Fe—B outer rotor brushless motor 21 with a high energy density. The fan blade 22 is made of complex materials. The brushless motor 21 has a stator composed of laminations of ultra-thin silicon steel, a single layer of which is 0.2 mm, and a motor rotor composed of a plurality of Nd—Fe—B magnet sheets. Compared to a carbon brush motor with ferrite magnets, the volume can be reduced by more than 10 times in the same power case. In another embodiment, the drive motor 21 is a brush motor, which is not specifically limited in this embodiment.

A damping rubber sleeve 7 is arranged in the airflow channel 6, and a mounting sleeve 8 is arranged in the damping rubber sleeve 7. The driving motor 21 is coaxially arranged in the mounting sleeve 8. A plurality of air ducts 9 are arranged on the mounting sleeve 8 circumferentially at intervals around the driving motor 21, and the air ducts 9 faces the fan blade 22 and the air inlet 4 respectively. It is noted that, an air inlet baffle 10 is fixed on the air inlet 4 with screws, and a plurality of air inlet holes 11 are arranged in the air inlet baffle 10. A sponge filter screen is arranged in the inner side of the air inlet baffle 10. The air inlet baffle 10 can block foreign matters with large particles from outside, and the sponge filter screen can block foreign matters of fine, soft and small particles such as dust and hair from outside.

Therefore, after a long-term use of the hair dryer, a large amount of foreign matters of small particles such as dust and hair will adhere to the outside of the sponge filter screen, which will reduce the air inlet volume of air inlet 4 and affect the air outlet volume of air outlet 5. Since the foreign matters of small particles such as dust and hair adhere to the outer surface of the sponge filter screen, the user needs to take the hair out of the air inlet holes 11 one by one, which is time-consuming and laborious. Therefore, in order to solve the above technical solutions, the present application provides a function of reverse blowing dust-cleaning in the hair dryer.

Figure 5:
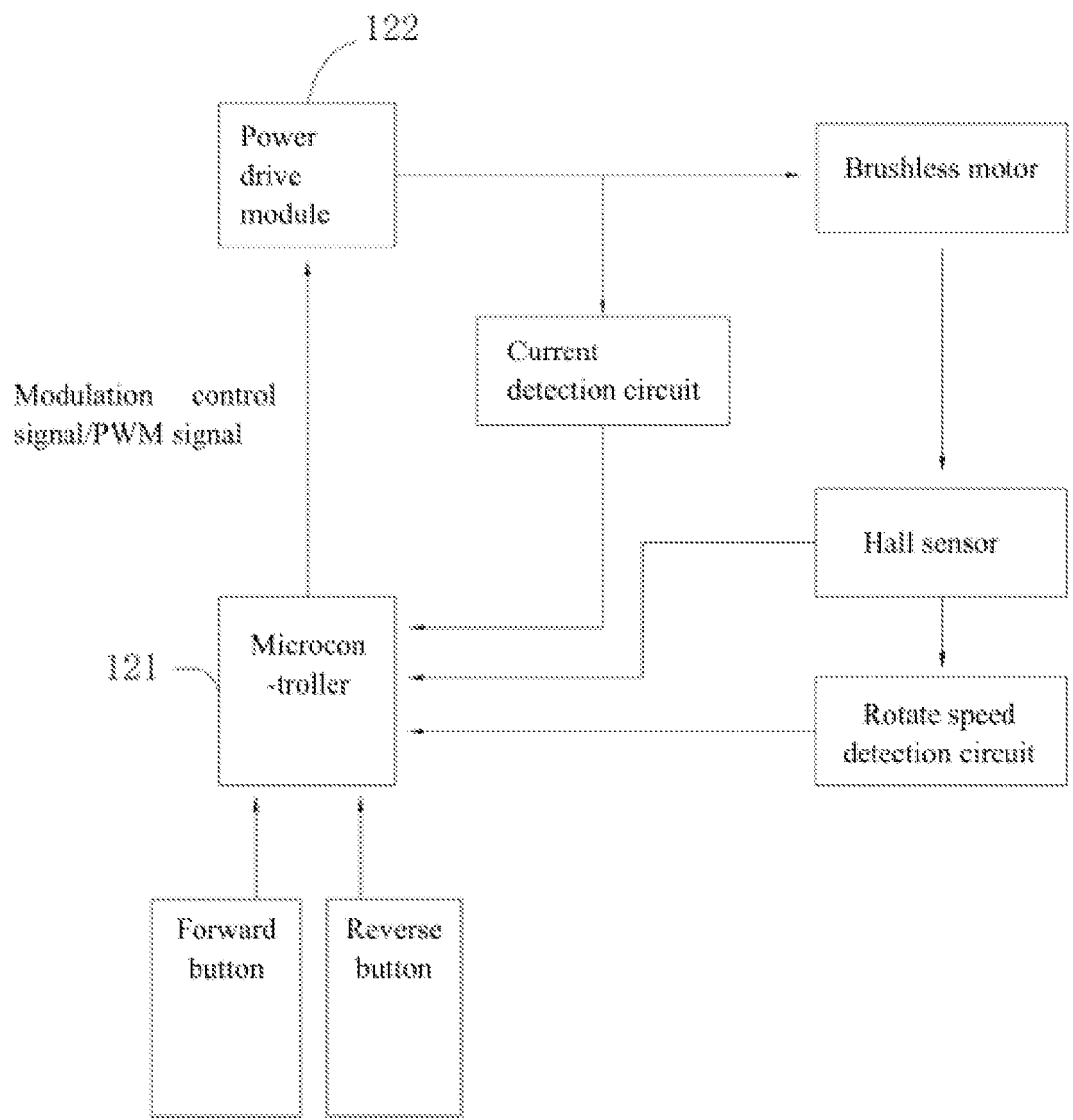
FIG. 5 is a circuit diagram of a circuit control board according to the present application.

In particular, as shown in FIGS. 3 and 5, a circuit control board 12 is fixedly arranged in the housing 1. The circuit control board 12 is arranged between the air inlet 4 and the air machine module 2. The air flowing from the air inlet 4 passes through the circuit control board 12 to cool the circuit control board 12. The circuit control board 12 is connected to the air machine module 2, and the housing 1 is provided with a trigger portion connected to the circuit control board 12 to control the forward rotation or reverse rotation of the air machine module 2.

The trigger portion can control the forward rotation or reverse rotation of the air machine module 2. When the air machine module 2 rotates forward, the air is introduced from the air inlet 4 and blown out from the air outlet 5. On the contrary, when the air machine module 2 rotates in reverse, air is introduced from the air outlet 5 and blown out from the air inlet 4. The form in which the trigger portion controls the forward rotation or reverse rotation of the air machine module 2 is not limited to this embodiment. In one embodiment, the trigger portion may be a physical button, and the air machine module 2 may be controlled to rotate forward by pressing the physical button once, and may be controlled to rotate in reverse by quickly pressing the physical button twice. In another embodiment, the trigger portion may be a touch button, and a logic for controlling the forward or reverse rotation of air machine module 2 can be customized according to requirements of users.

In particular, in an embodiment, a microcontroller 121 is arranged on the circuit control board 12 and a power drive module 122 is arranged in the housing 1. The power drive module 122 is connected to the air machine module 2, and the power drive module 122 is electrically connected to the driving motor 21 of the air machine module 2. In another embodiment, a microcontroller 121 and a power drive module 122 are arranged on the circuit control board 12. The position of the power drive module 122 may be adjusted according to requirements, which is not specifically limited in this embodiment.

Figure 2:
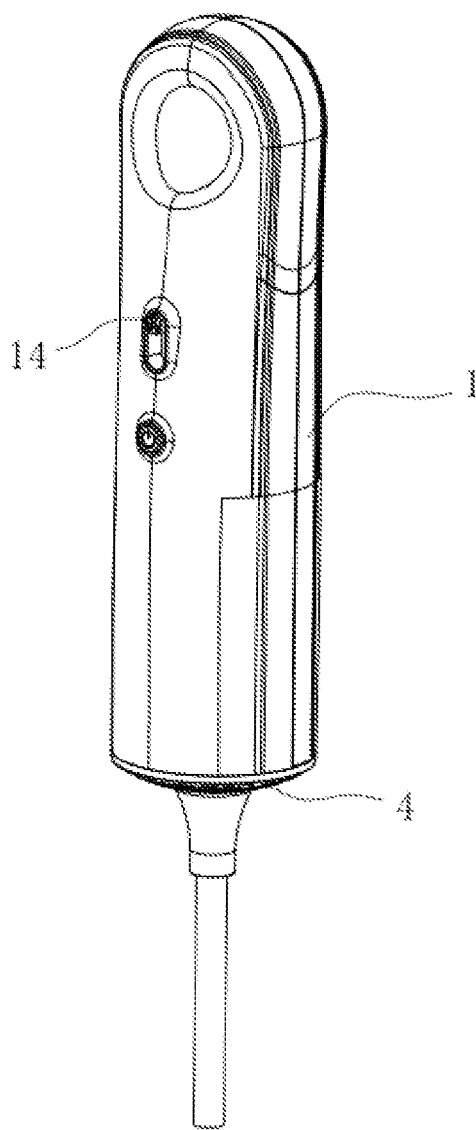
FIG. 2 is a schematic diagram illustrating a second overall structure of a hair dryer according to the present application.

The microcontroller 121 is connected to the power drive module 122. Referring to FIGS. 1 and 2, in this embodiment, the trigger portion is a physical button. The trigger portion includes a reverse button 13 and a forward button 14 that are arranged on the housing 1 and connected to the microcontroller 121. In response to a forward rotation signal output by the forward button 14, the microcontroller 121 outputs a modulation control signal to the power drive module 122, to control the air machine module 2 by the power drive module 122 to rotate forward. In response to a reverse signal output by the reverse button 13, the microcontroller 121 outputs a modulation control signal to the power drive module 122 to control the air machine module 2 by the power drive module 122 to rotate in reverse. The microcontroller 121 responds to a reverse signal output by the reverse button 13 only when the forward button 14 is not triggered. That is, the user presses the forward button 14 to control the air machine module 2 to rotate forward, and even though the user triggers the reverse button 13 at the same time, the microcontroller 121 will not respond to a reverse signal output by the reverse button 13 and will not control the air machine module 2 to act. Therefore, the microcontroller 121 responds to a forward rotation signal with a higher priority than a reverse signal.

It should be noted that, when the air machine module 2 rotates forward, the air flows in from the air inlet 4 and outs from the air outlet 5, and thus the air forms a forward airflow in the airflow channel 6, to achieve a blowing function of the hair dryer. On the contrary, when the air machine module 2 rotates in reverse, the air flows in from the air outlet 5 and out from the air inlet 4, and thus the air forms a reverse airflow in the airflow channel 6. The reverse airflow can impact on the sponge filter screen and the air inlet baffle 10, and then blow off the foreign matters such as dust, hair on the outer side of the sponge filter screen and the air inlet baffle 10 to achieve a reverse blowing dust-cleaning function.

The forward rotation and reverse rotation of air machine module 2 will be described in detail below.

Figure 6:
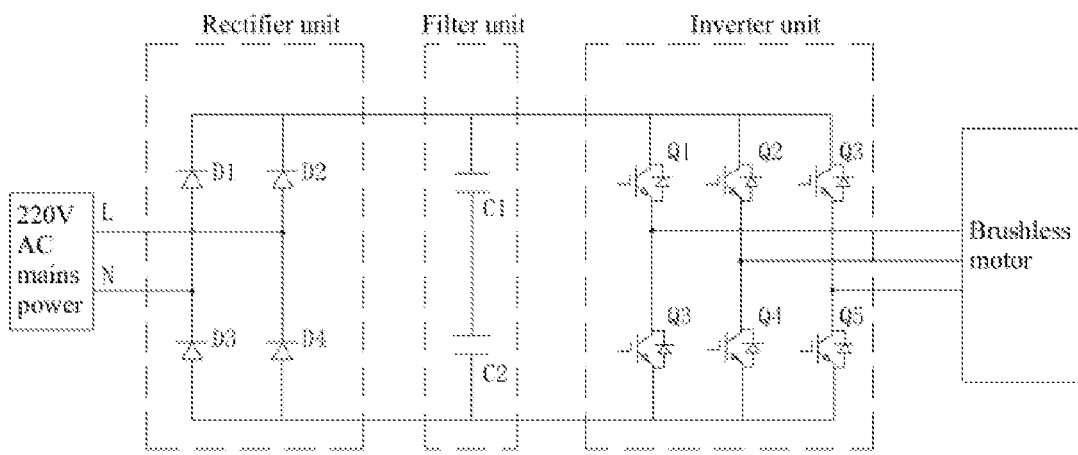
FIG. 6 is a circuit diagram of a power drive module according to the present application.

As shown in FIGS. 5 and 6, the power drive module 122 is configured to provide power for the air machine module 2 and drive the fan to rotate in response to a modulation control signal (PWM signal) output by the microcontroller 121. The power drive module 122 includes a rectifier unit, a filter unit and an inverter unit. The rectifier unit has an input end and an output end. The input end of the rectifier unit is connected to 220V AC mains power with a plug, and the output end of the rectifier unit is coupled to the filter unit.

The inverter unit is composed of six power transistors (Q1~Q6). The inverter unit has an input end, an output end and a control end. The input end of the inverter unit is coupled to the filter unit, the output end of the inverter unit is coupled to the driving motor 21 of the air machine module 2, and the control end of the inverter unit is coupled to the microcontroller 121 to receive the modulation control signal to control the operation of the air machine module 2. It should be noted that, the driving motor 21 is provided with a Hall sensor for sensing the position of the rotor. In order to rotate the driving motor 21, the microcontroller 121 senses the position of the rotor by means of the hall sensor, and further determines an order in which the power transistors in the inverter unit are turned on (or off) according to the stator winding, such that the current flows through motor coils in sequence to generate a forward (or reverse) rotating magnetic field and interact with the magnet of the rotor. In this way, the driving motor 21 can rotate clockwise/counterclockwise (forward/reverse). At the same time, the microcontroller 121 modulates the output modulation control signal, so as to change the frequency of the stator rotating magnetic field and thus the speed of the rotor to achieve a speed control of the air machine module 2.

Therefore, the inverter unit can convert the DC processed by the rectifier unit and the filter unit into AC for use by the driving motor 21, and control the forward rotation, reverse rotation and speed of the air machine module 2 based on the modulation control signal output by the microcontroller 121.

In one embodiment, the forward button 14 is a stepless regulating switch. In response to a forward rotation signal output by the forward button 14, the microcontroller 121 outputs a modulation control signal to the power drive module 122, and the power drive module 122 controls the air machine module 2 to rotate forward at an adjusted speed. In another embodiment, the forward button 14 is a multi-position switch. In response to a forward rotation signal output by the forward button 14, the microcontroller 121 outputs a modulation control signal to the power drive module 122, and the power drive module 122 controls the air machine module 2 to rotate forward at a speed corresponding to one of the multi-positions.

In one embodiment, the reverse button 13 is a key button. In response to a reverse signal output by the reverse button 13, the microcontroller 121 outputs a modulation control signal to the power drive module 122, and the power drive module 122 controls the air machine module 2 to rotate in reverse at a preset speed. In another embodiment, the reverse button 13 is a stepless regulating switch. In response to a reverse signal output by the reverse button 13, the microcontroller 121 outputs a modulation control signal to the power drive module 122, and the power drive module 122 controls the air machine module 2 to in reverse rotate at an adjusted speed.

Therefore, when the air inlet 4 are blocked by foreign matters such as hair and dust, resulting in a small air volume of the air outlet 5, in the present application, the reverse button 13 can be triggered to control the air machine module 2 to rotate in reverse at a high speed, so that the air machine module 2 can introduce air from the air outlet 5 and blow the air out from the air inlet 4, to blow off the foreign matters such as hair and dust blocked on the air inlet 4 in the reverse direction. In this way, the traditional method of manual cleaning of air inlet 4 by users is abandoned, and thus the dust-cleaning efficiency of air inlet 4 is improved.

Embodiment 2

Figure 4:
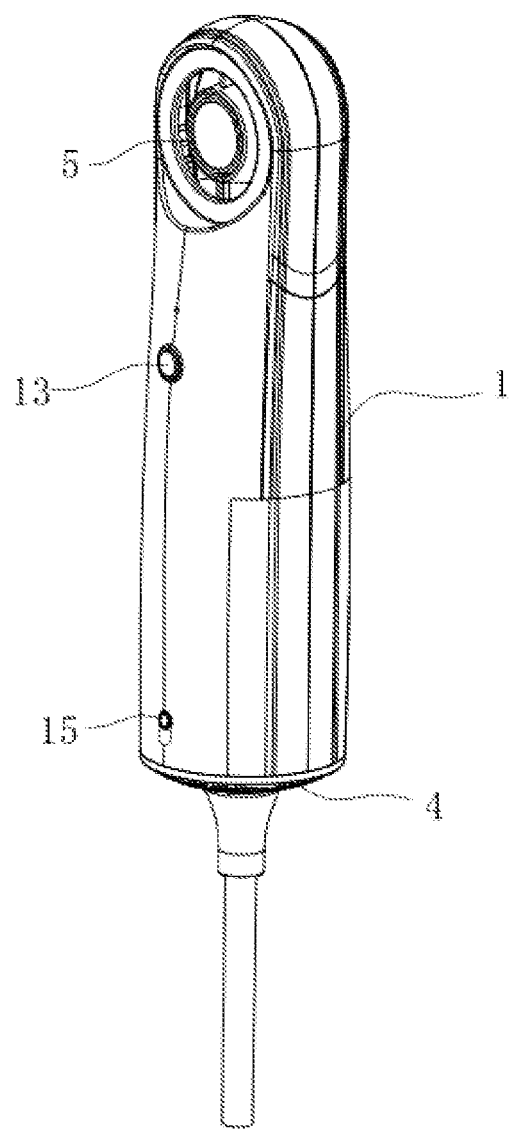
FIG. 4 is a schematic structural diagram of a hair dryer with a selector switch according to the present application.

As shown in FIGS. 4 and 5, the housing 1 is further provided with a selector switch 15 connected to the microcontroller 121. The selector switch 15 is configured with an automatic dust-cleaning mode and a manual dust-cleaning mode. In the manual dust-cleaning mode, the reverse button 13 can be started, and the user can control the air machine module 2 to rotate in reverse by manually triggering the reverse button 13.

In the automatic dust-cleaning mode, the microcontroller 121 controls the hair dryer to enter the dust-cleaning detection mode. The dust-cleaning detection mode in the automatic dust-cleaning mode is described in detail below.

The microcontroller 121 is connected to a current detection circuit and a rotate speed detection circuit. The circuit detection circuit is connected to the power drive module 122 to detect an input current from the air machine module 2. The rotate speed detection circuit is connected to the air machine module 2 to detect a rotate speed of the air machine module 2. The hall sensor can detect a rotor rotation position of the driving motor 21 in the air machine module 2. Furthermore, the rotate speed detection circuit can obtain the rotate speed of the air machine module 2 based on the hall sensor.

In the automatic dust-cleaning mode, the microcontroller 121 controls the hair dryer to enter the dust-cleaning detection mode. In the dust-cleaning detection mode, the microcontroller 121 calculates and determines the rotate speed and input current. Based on the rotate speed and input current of the air machine module 2 when the forward button 14 is triggered, the microcontroller 121 compares the input current at the rotate speed with a rated input current at a rated rotate speed to control the air machine module 2 to enter a to-be-cleaned state.

In particular, the relationship between the power and rotate speed of the driving motor 21 is: $P=T*n/9550$, where P is a rated power, n is a rated speed (r/min), T is a rated torque, and the rated power=a rated voltage*a rated current. Thus, in order to control the rotate speed of the driving motor 21 to be constant, if the rotate speed of the driving motor 21 decreases, the power of the driving motor 21 should be increased to maintain the rotate speed of the driving motor 21.

The user triggers the forward button 14 to control the rotation of the air machine module 2. The rotate speed of the air machine module 2 is a rotate speed adjusted by the forward button 14. In the present application, the forward button 14 may be set to one of adjustment positions, and the forward button 14 has a rated speed and a rated input current at this adjustment position.

If the air inlet 4 is blocked by foreign matters such as dust and hair, resulting in the increase of wind resistance in the airflow channel 6, it will make it difficult for the air machine module 2 to rotate, which will reduce the rotate speed of the air machine module 2. In order to maintain the rotate speed at the rated speed, the microcontroller 121 may increase the input current of the air machine module 2, and thus increase the power of the air machine module 2 to maintain the rotate speed of the air machine module 2 at the rated speed. With comparing the input current with the rated input current, when the input current exceeds the error range of the rated input current, it indicates that the air inlet 4 is blocked by the foreign matters such as dust and hair, and the microcontroller 121 may control the hair dryer to enter a to-be-cleaned state.

In the to-be-cleaned state, the microcontroller 121 controls the air machine module 2 to rotate in reverse after a preset time for which the forward button 14 is not triggered. In one embodiment, the preset time for which the forward button 14 not to be triggered is 5 minutes, and the preset time for the reverse rotation of the air machine module 2 is 5 seconds.

The setting of the selector switch 15 enables the user to choose independently. In the automatic dust-cleaning mode, the microcontroller 121 controls the hair dryer to automatically carry out the reverse blowing dust-cleaning function without the user triggering the reverse button 13 alone, which improves the convenience of using the reverse blowing dust-cleaning function.

The above is only an exemplary embodiment of the present application and is not used to limit the scope of protection of the present application, which is determined by the appended claims.

LIST OF REFERENCES

1. Housing; 2. Air machine module; 21. Driving motor; 22. Fan blade; 3. Heating module; 4. Air inlet; 5. Air outlet; 6. Airflow channel; 7. Damping rubber sleeve; 8. Mounting sleeve; 9. Air duct; 10. Air inlet baffle; 11. Air inlet hole; 12. Circuit control board; 121. Microcontroller; 122. Power drive module; 13. Reverse button; 14. Forward button; 15. Selector switch.

What is claimed is:

1. A hair dryer having a reverse blowing dust-cleaning function, comprising: a housing, an air machine module, an air inlet, and an air outlet, the air inlet and the air outlet are arranged on the housing, a through airflow channel is formed between the air inlet and the air outlet in the housing, the air machine module is arranged in the through airflow channel of the housing, wherein a circuit control board is arranged in the housing, the circuit control board is connected to the air machine module, and a trigger portion is arranged on the housing, the trigger portion is connected to the circuit control board for controlling the air machine module to rotate forward or in reverse, wherein a microcontroller is provided on the circuit control board, a power drive module is provided in the housing, the power drive module is connected to the air machine module, the microcontroller is connected to the power drive module, and the trigger portion is connected to the microcontroller, wherein the trigger portion comprises a reverse button and a forward button that are arranged on the housing and connected to the microcontroller, the microcontroller responds to a forward rotation signal output by the forward button to control, by the power drive module, the air machine module to rotate forward, the microcontroller responds to a reverse signal output by the reverse button to control, by the power drive module, the air machine module to rotate in reverse, and the microcontroller responds to the reverse signal output by the reverse button only when the forward button is not triggered, and wherein the microcontroller is connected to a current detection circuit and a rotate speed detection circuit, the current detection circuit is connected to the power drive module for detecting a current input current of the air machine module, and the rotate speed detection circuit is connected to the air machine module for detecting a current rotate speed of the air machine module; the microcontroller is configured to control the hair dryer to enter a dust-cleaning detection mode, in the dust-cleaning detection mode, based on the current rotate speed and the current input current of the air machine module when the forward button is triggered, the microcontroller compares the current input current at the current rotate speed with a rated input current at a rated rotate speed to control the air machine module to enter a to-be-cleaned state; and in the to-be-cleaned state, the microcontroller controls the air machine module to rotate in reverse after a preset time for which the forward button is not triggered.

2. The hair dryer having a reverse blowing dust-cleaning function according to claim 1, wherein the air machine module comprises a driving motor and a fan blade arranged on an output shaft of the driving motor, and the driving motor is electrically connected to the power drive module.

3. The hair dryer having a reverse blowing dust-cleaning function according to claim 2, wherein a mounting sleeve is arranged in the through airflow channel, and the driving motor is arranged in the mounting sleeve.

4. The hair dryer having a reverse blowing dust-cleaning function according to claim 1, wherein an air inlet baffle is arranged at the air inlet, a plurality of air inlet holes are arranged on the air inlet baffle, and a sponge filter screen is arranged on an inner side of the air inlet baffle.

5. The hair dryer having a reverse blowing dust-cleaning function according to claim 1, wherein the reverse button is a key button, the microcontroller outputs a modulation control signal to the power drive module in response to the reverse signal being output by the reverse button, and the air machine module is controlled by the power drive module to rotate in reverse at a preset rotate speed.

6. The hair dryer having a reverse blowing dust-cleaning function according to claim 1, wherein the forward button is a stepless regulating switch, the microcontroller outputs a modulation control signal to the power drive module in response to the forward rotation signal being output by the forward button, and the air machine module is controlled by the power drive module to rotate forward at a regulated rotate speed.

7. The hair dryer having a reverse blowing dust-cleaning function according to claim 1, wherein the housing is further provided with a selector switch connected to the microcontroller, and the selector switch is configured to have an automatic dust-cleaning mode and a manual dust-cleaning mode;
- in the manual dust-cleaning mode, the reverse button is allowed to be started;
- in the automatic dust-cleaning mode, the microcontroller controls the hair dryer to enter the dust-cleaning detection mode.

* * * * *